United States Patent
Choi

(10) Patent No.: US 8,042,985 B2
(45) Date of Patent: Oct. 25, 2011

(54) DISPLAY APPARATUS OF PORTABLE TERMINAL

(75) Inventor: Jae Seung Choi, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 258 days.

(21) Appl. No.: 12/428,052

(22) Filed: Apr. 22, 2009

(65) Prior Publication Data
US 2010/0002463 A1    Jan. 7, 2010

(30) Foreign Application Priority Data
Jul. 3, 2008  (KR) .................. 10-2008-0064521

(51) Int. Cl.
*F21V 7/04*   (2006.01)

(52) U.S. Cl. .................. 362/617; 362/97.1; 362/607

(58) Field of Classification Search ........ 362/97.1–97.3, 362/606–607, 617–626; 349/62, 65
See application file for complete search history.

(56) References Cited

U.S. PATENT DOCUMENTS
4,922,384 A * 5/1990 Torrence .................. 362/611

FOREIGN PATENT DOCUMENTS
JP  8-122778  5/1996
KR  20-0188124  4/2000

* cited by examiner

*Primary Examiner* — Jason Moon Han
(74) *Attorney, Agent, or Firm* — The Farrell Law Firm, P.C.

(57) ABSTRACT

A display apparatus of a portable terminal are provided that includes a light source for generating and outputting internal light; a display device for receiving the internal light from the light source through its one side and refracting the incident internal light to its upper side; and a display mirror layer. The display mirror layer includes a half mirror layer for receiving the internal light refracted by the display device and allowing it to pass therethrough to the outside; and a flange mirror layer for receiving the internal light from the light source and reflecting it. The display apparatus is configured in such a way that a display mirror layer is placed between the display device and the display window, so that it can enhance the clarity of images displayed on the display area and improve the appearance of the portable terminal.

6 Claims, 3 Drawing Sheets

United States Patent US 8,042,985 B2

DISPLAY APPARATUS OF PORTABLE TERMINAL

PRIORITY

This application claims priority to an application entitled "DISPLAY APPARATUS OF PORTABLE TERMINAL" filed in the Korean Intellectual Property Office on Jul. 3, 2008 and assigned Serial No. 10-2008-0064521, the contents of which are incorporated herein by reference.

BACKGROUND OF THE INVENTION

1. Field of the Invention

The present invention relates to a portable terminal, and, more particularly, to a display apparatus of a portable terminal.

2. Description of the Related Art

In recent years, portable terminals have performed a variety of functions and composite functions. They provide a call function and also allow for various convenient functions, such as text messaging, a wireless Internet, phone book management, memory management, navigation, etc. To perform these composite functions, portable terminals have a display apparatus through which images are displayed when various functions are performed.

FIG. 1 is a cross-sectional view illustrating a conventional display apparatus of a portable terminal. As shown in FIG. 1, the conventional display apparatus 100 includes a light source 110, a display device 120, and a display window 140. The light source 110 generates and outputs internal light. The display device 120 receives the internal light from the light source 110 on one side thereof and refracts the incident internal light to an upper side thereof. The display window 140 receives the internal light from the display device 120 and allows the received light to pass therethrough to the outside, thereby displaying images on a Display Area (DA) in the upper side of the display device 120.

However, in such conventional devices, the window display allows the internal light from the display device and the internal light from the light source to pass therethrough to the outside. This increases the luminous intensity around the periphery apart from the display area of the display apparatus. In such conventional devices a problem exists where the luminous intensity around the periphery of the DA is relatively higher than that of the internal area of the DA. Therefore, the display apparatus cannot clearly display images thereon.

Furthermore, since the display window is made of transparent material, an internal shape of the display window is exposed, which mars the appearance of the portable terminal.

SUMMARY OF THE INVENTION

The present invention has been designed to address to address at least the problems and/or disadvantages the above problems and to provide at least the advantages described below. In the present invention a display apparatus is provided of a portable terminal that allows internal light refracted by a display device to pass therethrough and reflects the internal light from a light source.

An aspect of the embodiments of the present invention provides a display apparatus of a portable terminal that includes a light source for generating and outputting internal light; a display device for receiving the internal light from the light source through its one side and refracting the incident internal light to its upper side; and a display mirror layer. The display mirror layer includes a half mirror layer for receiving the internal light refracted by the display device and allowing it to pass therethrough to the outside; and a flange mirror layer for receiving the internal light from the light source and reflecting it.

In a further aspect of the present invention, the flange mirror layer forms a prism pattern part on its lower side to refract the internal light from the light source to the half mirror layer.

BRIEF DESCRIPTION OF THE DRAWINGS

The features and advantages of the present invention will become more apparent from the following detailed description in conjunction with the accompanying drawings, in which.

DETAILED DESCRIPTION OF PREFERRED EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
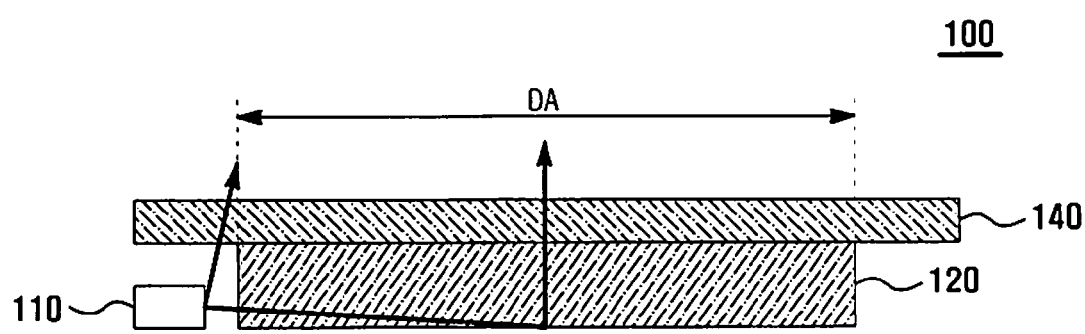
FIG. 1 is a cross-sectional view illustrating a conventional display apparatus of a portable terminal.
Figure 2:
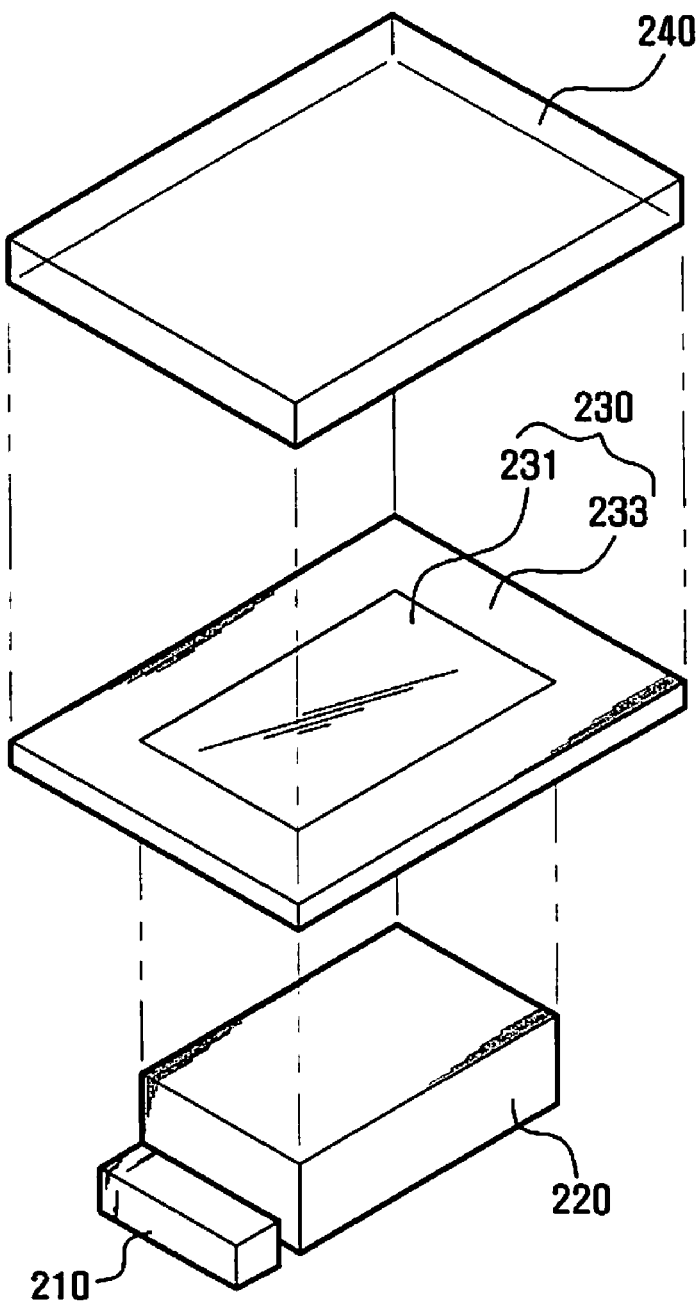
FIG. 2 is an exploded perspective view illustrating a display apparatus of a portable terminal according to an embodiment of the present invention.
Figure 3:
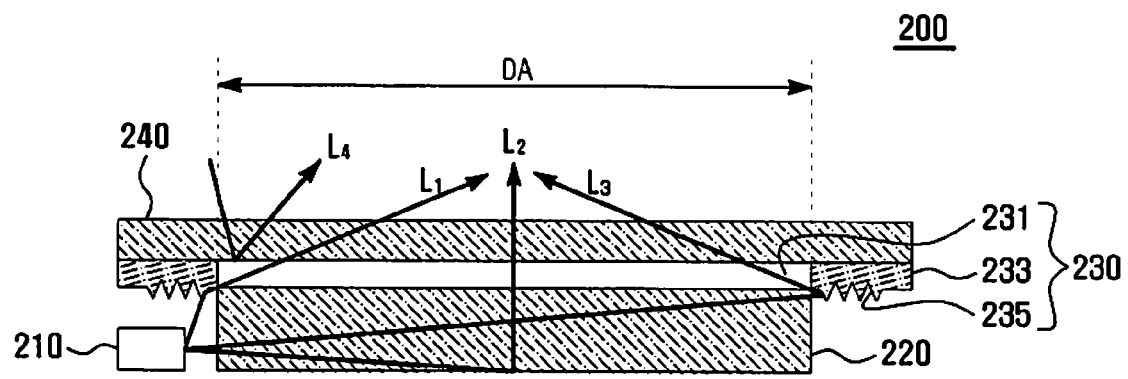
FIG. 3 is a cross-sectional view illustrating a display apparatus of a portable terminal according to an embodiment of the present invention.

As shown in FIGS. 2 and 3, the display apparatus 200 according to an embodiment of the present invention includes a light source 210, a display device 220, a display mirror layer 230, and a display window 240.

The light source 210 generates and outputs internal light. The light source 210 serves as a line light source. The light source 210 may be one of a Light Emitted Diode (LED), Cold Cathode Fluorescent Lamp (CCFL), and External Electrode Fluorescent Lamp (EEFL). The light source 210 preferably outputs the internal light in a radial direction or predetermined direction.

The display device 220 processes the internal light to display images. The display device 220 receives the internal light from the light source 210 through one side thereof and refracts the internal light to an upper side thereof. The display device 220 serves as a planar light source and thus outputs the refracted internal light as planar light through the upper side thereof. Images are displayed by output by the display device 220 of the internal planar light. In an embodiment of the present invention, the display device 220 is a Liquid Crystal Display (LCD), but is not so limited. The display device 220 may also be configured to further include a Light Guide Plate (LGP), a reflection plate, an optical plate, and an LCD panel.

The LGP is located parallel to the light source 210. The light guide plate receives the internal light from the light source 210 and allows the internal light to pass therethrough. The light guide plate is preferably made of a material having superior mechanical strength and superior optical transmission, such as polymethyl methacrylate. Alternatively, the light guide plate may be located adjacent to the light source 210 or spaced a predetermined distance apart from the light source 210.

The reflection plate is installed onto a lower side of the light guide plate. The reflection plate serves to reflect the internal light, transmitted from the light guide plate to the reflection plate, to the light guide plate. That is, the reflection plate refracts the internal light incident thereto to the light guide plate, so that the light guide plate allows the internal light to pass therethrough to its upper side. The reflection plate may be implemented to have a flat surface or to have a plurality of concaved grooves on the surface thereof.

The optical plate is installed onto the upper side of the light guide plate. The optical plate processes the light transmitted from the light guide plate and allows the light to pass therethrough. The optical plate is preferably configured to include a diffusion sheet, a polarizing sheet, and a brightness sheet. The diffusion sheet uniformly diffuses the internal light from the light guide plate. The polarizing sheet polarizes the internal light in the vertical direction. The brightness sheet allows the internal light polarized parallel to a transmission axis to pass therethrough but reflects the internal light, polarized vertical to the transmission axis, to the light guide plate.

The LCD panel is installed onto the upper side of the optical plate. The LCD panel is configured to include a Thin Film Transistor (TFT) plate and a color filter plate, where liquid crystal is injected into a gap between the TFT plate and the color filter plate. The TFT plate changes the liquid crystal array to change the transmission of the internal light from the light guide plate. The TFT plate processes the internal light by controlling the array of liquid crystal. The color filter plate processes the internal light passing through the liquid crystal array to output select colors. The color filter plate includes a plurality of red-, green-, and blue-pixels to allow the internal light to be emitted with a certain color.

The display mirror layer 230 is installed above and on the upper sides of the light source 210 and the display device 220. The display mirror layer 230 includes a half mirror layer 231 and a flange mirror layer 233.

The half mirror layer 231 is located on the upper side of the display device 220. The half mirror layer 231 receives the internal light from the display device 220 and allows the internal light to be transmitted to the outside. When the half mirror layer 231 receives external light, the half mirror layer 231 reflects the external light back outside.

Figure 4:
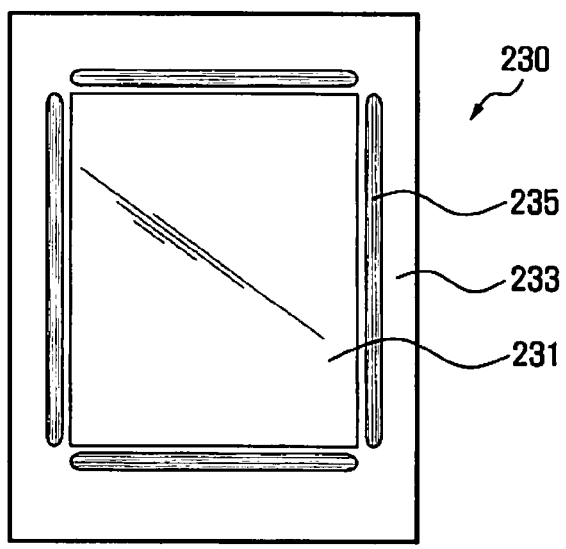
FIG. 4 is a rear view illustrating a display mirror layer of a display apparatus of a portable terminal according to an embodiment of the present invention.

The flange mirror layer 233 is located above the light source 210 and at the sides of the half mirror layer 231. The flange mirror layer 233 is preferably located at least one of the sides of the half mirror layer 231. As shown in FIG. 4, the flange mirror layer 233 is preferably located along each of the sides of the half mirror layer 231. The flange mirror layer 233 receives the internal light from the light source 210 and reflects the internal light.

The flange mirror layer 233 forms prism pattern parts 235 on it's a lower side thereof, which refract the internal light from the light source 210 of the display device 220. These prism pattern parts 235 receive the internal light from the light source 210 and refract the internal light to the half mirror layer 231. Each of the prism pattern parts 235 is formed to have a plurality of concaved grooves that are arrayed parallel to the side of the half mirror layer 231, where the total shape of the concaved grooves is similar to a band binding the half mirror layer 231. In order to uniformly refract the internal light, each of the prism pattern parts 235 has a plurality of reflection surfaces that are declined, respectively, at varying angles. For example, the half mirror layer 231 may be distinguished with a plurality of reflection areas, with these reflection areas respectively allocated to reflection sides. In such case, when respective reflection sides receive the internal light, the respective reflection sides refract the internal light to respective reflection areas.

The display window 240 is located on an upper side of the display mirror layer 230. The display window 240 prevents the display device 220 from direct exposure to and protects the display device 220 against the external environment. To this end, after the display mirror layer 230 is deposited in the display window 240, the display window 240 with the display mirror layer 230 is preferably installed on the upper side of the display device 220. The display window 240 receives the internal light through the half mirror layer 231 and allows the internal light to pass therethrough. On the other hand, when the display window 240 receives external light, the display window 240 allows the external light to pass therethrough. The display window 240 is preferably made of materials having superior characteristics, such as light transmission, heat resistance, chemical resistance, and mechanical strength. For example, the display window 240 may be a transparent film or a glass plate made of polyethylene terephthalate or other suitable material. The display window 240 may also be a plastic plate made of polymethyl methacrylate, polyamide, polyimide, polypropylene, of polyurethane.

In the following description, the operation of the display apparatus 200 according to an embodiment of the present invention is explained, along with the traveling of internal and external light.

Referring to FIG. 3, when internal light $L_1$ is emitted from the light source 210 and incident to the flange mirror layer 233, the internal light $L_1$ is refracted by the prism pattern parts 235 to the half mirror layer 231 and then transmitted to the outside through the half mirror layer 231 and the display window 240. In addition, when internal light $L_2$ and internal light $L_3$ are emitted from the light source 210 and are incident to the display device 220, internal light $L_2$ and internal light $L_3$ are refracted by the display device 220 or pass through the display device 220. If internal light $L_2$ is refracted by the display device 220, internal light $L_2$ travels through the display device 220 and then is transmitted to the outside through the half mirror 231 and the display window 240. On the other hand, if the internal light $L_3$ travels and passes through the display device 220 to the outside, internal light $L_3$ is reflected by the prism pattern parts 235 to the half mirror layer 231 and then transmitted to the outside through the half mirror layer 231 and the display window 240. When the internal light travels as described above, the display apparatus 200 displays images on a Display Area (DA) of a corresponding size in the upper side of the display device 220. On the contrary, when external light $L_4$ is incident on the half mirror layer 231 through the display window 240, external light $L_4$ is reflected to the outside. Therefore, the display apparatus 200 according to the present invention prevents exposure of an interior shape from being exposed.

As described above, since the display mirror layer 230 is inserted and placed between the display device 220 and the display window 240, the display apparatus 200 enhances the clarity of images displayed on the DA and improves the appearance of the portable terminal. That is, since the half mirror layer 231 is located on the upper side of the display device 220, the display apparatus 200 can prevent an interior shape from being exposed to the outside through the display window 240, thereby improving the appearance of the portable terminal. Since the flange mirror layer 233 can reflect the internal light transmitted to the periphery of the DA, i.e., around the DA, to the half mirror layer 231, the display apparatus 200 of the present invention enhances the transmission of the internal light and thus improves the clarity of images displayed thereon.

Although preferred embodiments of the present invention are implemented to adjacently locate the light source with at least one of the sides of the display device, it should be understood that the present invention is not limited to the present embodiments. For example, it will be recognized that the embodiments can be modified locate the light source adjacent to at least two sides of the display device. In that case, the flange mirror layer is located above the light source and is located at least two sides of the half mirror layer.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A display apparatus of a portable terminal, the display apparatus comprising:
   a light source for generating and outputting internal light;
   a display device for receiving the internal light from the light source through one side thereof and refracting the incident internal light to an upper side thereof; and
   a display mirror layer including:
      a half mirror layer for receiving the internal light refracted by the display device and allowing the internal light to pass therethrough; and
      a flange mirror layer for reflecting the internal light received from the light source,
      wherein the flange mirror layer forms a prism pattern part on a lower side thereof to refract the internal light from the light source to the half mirror layer.

2. The display apparatus of claim 1, wherein the prism pattern part includes a plurality of reflection sides declined to different respective reflection angles to uniformly refract the internal light from the light source to the half mirror layer.

3. The display apparatus of claim 1, wherein the half mirror layer receives and reflects external light.

4. The display apparatus of claim 3, wherein the display mirror layer further comprises:
   a display window for allowing the transmitted internal light or the external light to pass therethrough.

5. The display apparatus of claim 1, wherein the flange mirror layer is located at least two sides of the half mirror layer.

6. The display apparatus of claim 5, wherein the light source is located adjacent to at least two sides of the display device.

* * * * *